United States Patent
Park et al.

(10) Patent No.: US 9,155,059 B2
(45) Date of Patent: Oct. 6, 2015

(54) METHOD FOR PERFORMING DEREGISTRATION WITH CONTENT RETENTION MODE IN BROADBAND WIRELESS ACCESS SYSTEM

(75) Inventors: Gi Won Park, Anyang-si (KR); Yong Ho Kim, Anyang-si (KR); Ki Seon Ryu, Anyang-si (KR)

(73) Assignee: LG Electronics Inc., Seoul (KR)

(*) Notice: Subject to any disclaimer, the term of this patent is extended or adjusted under 35 U.S.C. 154(b) by 507 days.

(21) Appl. No.: 13/520,995

(22) PCT Filed: Jan. 7, 2011

(86) PCT No.: PCT/KR2011/000118
§ 371 (c)(1),
(2), (4) Date: Jul. 6, 2012

(87) PCT Pub. No.: WO2011/084008
PCT Pub. Date: Jul. 14, 2011

(65) Prior Publication Data
US 2012/0322491 A1    Dec. 20, 2012

Related U.S. Application Data

(60) Provisional application No. 61/293,181, filed on Jan. 7, 2010, provisional application No. 61/302,478, filed on Feb. 8, 2010.

(30) Foreign Application Priority Data

Nov. 17, 2010  (KR) .................. 10-2010-0114309
Nov. 17, 2010  (KR) .................. 10-2010-0114310

(51) Int. Cl.
*H04M 1/00*   (2006.01)
*H04W 60/06*  (2009.01)
*H04W 36/00*  (2009.01)
*H04W 72/04*  (2009.01)

(52) U.S. Cl.
CPC .......... *H04W 60/06* (2013.01); *H04W 36/0077* (2013.01); *H04W 72/042* (2013.01)

(58) Field of Classification Search
CPC .............. H04W 60/06; H04W 72/042; H04W 36/0077
USPC ......... 455/517, 68, 509, 435.1; 370/338, 311, 370/235
See application file for complete search history.

(56) References Cited

U.S. PATENT DOCUMENTS

| | | | |
|---|---|---|---|
| 2007/0298725 A1* | 12/2007 | Ryu ............................... | 455/68 |
| 2010/0296426 A1 | 11/2010 | Lee et al. | |
| 2011/0044307 A1* | 2/2011 | Mohanty et al. .............. | 370/338 |
| 2011/0159906 A1 | 6/2011 | Baek et al. | |
| 2011/0199967 A1 | 8/2011 | Yang et al. | |

* cited by examiner

*Primary Examiner* — Shaima Q Aminzay
(74) *Attorney, Agent, or Firm* — Dentons US LLP

(57) ABSTRACT

The present invention relates to a broadband wireless access system, and more specifically, to a deregistration with content retention mode operation procedure initiated by a base station. According to one embodiment of the present invention, the present invention provides a method for, a mobile station, performing a deregistration with content retention (DCR) mode by a request of a base station in a broadband wireless access system, and the method comprises the steps of: receiving a first broadcast message for indicating entry into the DCR mode from the base station; transmitting a second message for requesting the entry into the DCR mode to the base station; receiving a third broadcast message that includes acknowledgement (ACK) information for indicating whether the second message is detected, and entering the DCR mode if the ACK information indicates a successful detection of the second message.

11 Claims, 10 Drawing Sheets

METHOD FOR PERFORMING DEREGISTRATION WITH CONTENT RETENTION MODE IN BROADBAND WIRELESS ACCESS SYSTEM

This Application is a 35 U.S.C. §371 National Stage Entry of International Application No. PCT/KR2011/000118, filed Jan. 7, 2011 and claims the benefit of U.S. Provisional Application No. 61/293,181, filed Jan. 7, 2010, U.S. Provisional Application No. 61/302,478, filed Feb. 8, 2010, and Korean Application Nos: 10-2010-0114309, filed Nov. 17, 2010 and 10-2010-0114310, filed Nov. 17, 2010, all of which are incorporated by reference in their entirety herein.

FIELD OF THE INVENTION

The present invention relates to a broadband wireless access system and, more particularly, to a deregistration with content retention mode operation procedure initiated by a base station and a deregistration with content retention mode operation procedure of a mobile station respective to a message indicating a self configuration status of the base station.

BACKGROUND ART

Hereinafter, an idle mode of a mobile station and a paging group related to the exemplary embodiments of the present invention will be briefly described.

Generally, when a mobile station moves in a wireless link environment, which is configured of multiple base stations, the idle mode refers to an operation mode of a mobile station that can enable the mobile station to periodically perform DL (Down Link) broadcast traffic transmission (or transport) even if the corresponding mobile station is not registered to a specific base station.

In case the mobile station does not receive any traffic from the base station for a predetermined period of time, the operation mode of the mobile station may be shifted to the idle mode for the purpose of Power saving. The mobile station being shifted to the idle mode may receive a broadcast message (e.g., paging message) being transmitted from the base station during an average interval (Available interval), so as to determine whether the mobile station should shift its operation mode to a normal mode or remain operating in the idle mode. Additionally, by performing a position (or location) update, the mobile station operating in the idle mode may notify its position (or location) to a Paging controller.

By removing handover-related activation requests and general management requests, the idle mode may provide the mobile station with benefits. By limiting the mobile station activities to performing scanning in a discrete cycle period, the idle mode may allow the mobile station to save the power and management resources used by the mobile station.

Furthermore, by providing provides a simple and adequate method for notifying the mobile station of any pending downlink traffic, and by removing any wireless (or radio) interface and network HO (Hand Over) traffic from a non-active (or inactive) mobile station, the idle mode may provide the network and base station with benefits.

Herein, paging refers to a function of determining the position (or location) (e.g., which base station or which switch (or exchange) center) of a corresponding MS (Mobile Station), when an incoming call occurs in a mobile communication. Multiple BSs (Base Stations) supporting the Idle Mode may belong to a specific Paging Group, so as to configure a paging region (or area or section).

At this point, a paging group represents a logical group. When a traffic targeting a mobile station (MS) exists, the purpose of the paging group is to provide a close-range area (or region or section) that can be paged via DL (Down Link). It is preferable that the paging group satisfies the conditions of being large enough to allow a specific mobile station to exist within the same paging group during most of the time and being small enough to maintaining an adequate level of paging load (or duty).

However, in a general IEEE802.16 based wireless communication system, the mobile station is forced to enter the idle mode, even if the mobile station is not required to perform any paging procedure in order to save power. And, accordingly, the mobile station is unnecessarily forced to be allocated with information related to paging. In this case, while being operated in the idle mode, the mobile station is forced to be activated (or awake) during the corresponding paging section (or paging interval) even if the mobile station is not required to receive any paging message.

Therefore, the base station triggers a context retention timer. Meanwhile, the base station stores the connection information (context) of the mobile station. Thus, in order to facilitate the network re-entry of the mobile station, a DCR (Deregistration with Content Retention) mode is defined.

The DCR mode may be initiated through a message requesting the base station for a DCR mode entry, i.e., a deregistration request (DREG-REQ) message. However, in case the mobile station is required to be deregistered due to the circumstances of the base station (e.g., base station reconfiguration or restart, etc.), and when the base station directs the corresponding mobile station with DCR mode entry, the network re-entry procedure of the deregistered mobile station may be efficiently performed.

However, in the current IEEE 802.16m system, the method of the base station for initiating the DCR mode is not yet defined. And, therefore, an efficient procedure for initiating the DCR mode is required to be defined.

Subsequently, an AAI_SON-ADV (Self Organizing and Optimizing Network) message will hereinafter be described.

The AAI_SON-ADV (Self Organizing and Optimizing Network) message is used for broadcasting SON-related information from a base station (ABS), which is connected to (or accessing) a core access network supporting the self organizing and optimizing network (SON).

An Action Type field is defined in the AAI_SON-ADV message as shown in Table 1 shown below.

TABLE 1

| Field | Size (bits) | Value/Description | Condition |
|---|---|---|---|
| Action Type | 3 | Used to indicate the purpose of this message<br>0b000: ABS Reconfiguration<br>0b001: ABS Restart<br>0b010: ABS Scanning<br>0b011: ABS Reliability<br>0b100: LDM parameter change | mandatory |

Referring to Table 1, the Action Type field may indicate (or direct) ABS reconfiguration, ABS Restart, ABS scanning, ABS Reliability, and LDM (Low Duty Mode) parameter change.

Depending upon the action type, the AAI_SON-ADV message may be accompanied by subordinate fields. And, by using such subordinate fields, a service unavailable point, at which the base station is unable to provide normal services to the mobile station, a service unavailable section (or interval), and/or a new frequency band (FA).

However, in the current IEEE 802.16m system, in case the base station broadcasts the AAI_SON-ADV message, a detailed action (or operation) procedure, e.g., whether or not the DCR mode is being initiated, of the mobile station receiving the AAI_SON-ADV message transmitted from the base station is yet to be defined, an efficient procedure for performing the same is required to be defined.

DETAILED DESCRIPTION OF THE INVENTION

Technical Objects

The present invention is devised to obviate the above-described general technical objects (or problems), and, therefore, an object of the present invention is to provide an efficient procedure for enabling the base station to initiate a Deregistration with Content Retention (DCR) mode and a device for performing the same.

Additionally, another object of the present invention is to provide an efficient procedure of a mobile station for receiving an AAI_SON-ADV (Self Organizing and Optimizing Network) message from the base station and a device for performing the same.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the above-described general technical objects of the present invention, according to an embodiment of the present invention, a method of a mobile station for performing a Deregistration with Content Retention (DCR) mode respective to a request from a base station in a broadcast wireless access system may include the steps of receiving a first broadcast message indicating an entry to the DCR mode from the base station; transmitting a second message requesting the DCR mode entry to the base station; receiving a third broadcast message including acknowledgement (ACK) information indicating whether or not the second message has been detected; and, in case the ACK information indicates a successful detection of the second message, entering the DCR mode.

At this point, it is preferable that the first broadcast message includes an identifier configured to identify the mobile station in the DCR mode and transmission opportunity offset information configured to indicate an uplink resource for transmitting the second message, that the ACK information is configured in a bitmap format, and that the second message is transmitted through an uplink resource indicated by the transmission opportunity offset information.

Additionally, in case the bit respective to the mobile station within the bitmap indicates that the detection of the second message has failed, the method may further include the steps of retransmitting the second message to the base station; or performing handover to another base station.

Additionally, it is preferable that the first broadcast message corresponds to a DCR advertisement (AAI_DCR-ADV) message having its Action code field assigned with a value indicating an entry to the DCR mode, and that the third broadcast message corresponds to the DCR advertisement message having the Action code field assigned with a value indicating a response to the second message.

Furthermore, it is preferable that, when the first broadcast message is transmitted along with a control extension header (MCEH) indicating a transmission of the second message, the second message corresponds to a message acknowledgement response (AAI_MSG-ACK) message or a Quick Access Message being transmitted along with a bandwidth request (BR) preamble sequence, and that, when the first broadcast message is not accompanied with the control extension header, the second message corresponds to a deregistration request message having its deregistration request code assigned with a value of 0x04.

In order to achieve the above-described general technical objects of the present invention, according to an embodiment of the present invention, a method of a mobile station for performing a Deregistration with Content Retention (DCR) mode respective to at least one mobile station by a base station in an unsolicited manner in a broadcast wireless access system includes the steps of broadcasting a first broadcast message indicating an entry to the DCR mode; receiving a second message requesting the DCR mode entry from the at least one mobile station; and broadcasting a third broadcast message including acknowledgement (ACK) information indicating whether or not the at least one second message has been detected.

At this point, it is preferable that the first broadcast message includes an identifier configured to identify each of the at least one mobile station in the DCR mode and transmission opportunity offset information configured to indicate an uplink resource enabling each of the at least one mobile station to transmit the second message, and that the ACK information is configured in a bitmap format, and that the second message is received through an uplink resource indicated by the transmission opportunity offset information.

Additionally, it is preferable that the first broadcast message corresponds to a DCR advertisement (AAI_DCR-ADV) message having its Action code field assigned with a value indicating an entry to the DCR mode, and that the third broadcast message corresponds to the DCR advertisement message having the Action code field assigned with a value indicating a response to the second message.

Additionally, the second message may correspond to a deregistration request (AAI_DREG-REQ) message having its deregistration request code assigned with a value of 0x04.

Furthermore, when the first broadcast message is transmitted along with a control extension header (MCEH) indicating a transmission of the second message, the second message may correspond to a message acknowledgement response (AAI_MSG-ACK) message or a Quick Access Message being transmitted along with a bandwidth request (BR) preamble sequence.

In order to achieve the above-described general technical objects of the present invention, according to another embodiment of the present invention, a mobile station device performing a Deregistration with Content Retention (DCR mode) in a broadcast wireless access system, the mobile station device may include processor; and a radio frequency (RF) (or wireless communication) module configured to transmit and receive radio signals to and from an external source based upon a control of the processor. Herein, the processor may perform control operations so that the mobile station can first receive a first broadcast message indicating an entry to the DCR mode from the base station, transmit a second message requesting the DCR mode entry to the base station, then, receive a third broadcast message including acknowledgement (ACK) information indicating whether or not the second message has been detected, so as to enter the DCR mode, in case the ACK information indicates a successful detection of the second message.

At this point, it is preferable that the first broadcast message includes an identifier configured to identify the mobile station in the DCR mode and transmission opportunity offset information configured to indicate an uplink resource for transmitting the second message, and that the ACK information is configured in a bitmap format, and that the second message is transmitted through an uplink resource indicated by the transmission opportunity offset information.

Additionally, in case the bit respective to the mobile station within the bitmap indicates that the detection of the second message has failed, the controller may retransmit the second message to the base station; or may perform handover to another base station.

Additionally, it is preferable that the first broadcast message corresponds to a DCR advertisement (AAI_DCR-ADV) message having its. Action code field assigned with a value indicating an entry to the DCR mode, and that the third broadcast message corresponds to the DCR advertisement message having the Action code field assigned with a value indicating a response to the second message.

Furthermore, it is preferable that; when the first broadcast message is transmitted along with a control extension header (MCEH) indicating a transmission of the second message, the second message corresponds to a message acknowledgement response (AAI_MSG-ACK) message or a Quick Access Message being transmitted along with a bandwidth request (BR) preamble sequence, and that, when the first broadcast message is not accompanied with the control extension header, the second message corresponds to a deregistration request message having its deregistration request code assigned with a value of 0x04.

Additionally, in order to achieve the above-described general technical objects of the present invention, according to an embodiment of the present invention, a method of a mobile station for performing a Deregistration with Content Retention (DCR) mode respective to a request from a base station in a broadcast wireless access system may include the steps of receiving a first message in an unsolicited manner indicating an entry to the DCR mode from the base station and including start time information of a first time and interval information of the first time; transmitting a second message requesting the DCR mode entry to the base station before a start time indicated by the start time information; and, when a third message is received from the base station as a response to the second message, entering the DCR mode.

At this point, the method may further include the steps of transmitting a ranging request (AAI_RNG-REQ) message including an identifier configured to identify a mobile station in the DCR mode and a ranging purpose indication field being assigned with a value indicating network re-entry from the DCR mode, when the first time is exhausted (or expired); and receiving a ranging response (AAI_RNG-RSP) message from the base station, the ranging response (AAI_RNG-RSP) message including optimization information indicating a procedure that can be omitted during the network re-entry.

Additionally, the first message may correspond to a self organization and optimization network advertisement (AAI_SON-ADV) message, and the second message may correspond to a deregistration request (AAI_DREG-REQ) message having is deregistration request code assigned with a value of 0x04.

Additionally, the first message may correspond to a deregistration response (AAI_DREG-RSP) message including an action code field assigned with a first value, wherein the first value indicates a shift to the DCR mode in the mobile station in an unsolicited manner, and the second message may correspond to a deregistration request (AAI_DREG-REQ) message including a deregistration request code being assigned with a second value, wherein the second value requests for an entry to the DCR mode as a response to the first value.

Furthermore, it is preferable that the start time information corresponds to an unavailability start time (UTI) field, that the interval information corresponds to an unavailable time interval (UTI) field, that the identifier corresponds to a content retention identifier (CRID), and that the third message corresponds to a deregistration response (AAI_DREG-RSP) message or a message acknowledgement (AAI_MSG-ACK) message.

Additionally, in order to achieve the above-described general technical objects of the present invention, according to an embodiment of the present invention, a method of a mobile station for performing a Deregistration with Content Retention (DCR) mode respective to at least one mobile station by a base station in an unsolicited manner in a broadcast wireless access system includes the steps of transmitting a first message to the at least one mobile station in an unsolicited manner, the first message indicating an entry to the DCR mode from the base station and including start time information of a first time and interval information of the first time; receiving a second message requesting the DCR mode entry to from the at least one mobile station before a start time indicated by the start time information; and transmitting a third message to the at least one mobile station as a response to the second message.

At this point, the method may further include the steps of receiving a ranging request (AAI_RNG-REQ) message from any one of the mobile stations, the ranging request (AAI_RNG-REQ) message including an identifier configured to identify a mobile station in the DCR mode and a ranging purpose indication field being assigned with a value indicating network re-entry from the DCR mode, when the first time is exhausted (or expired); and transmitting a ranging response (AAI_RNG-RSP) message from to the any one of the mobile stations, the ranging response (AAI_RNG-RSP) message including optimization information indicating a procedure that can be omitted during the network re-entry.

Additionally, the first message may correspond to a self organization and optimization network advertisement (AAI_SON-ADV) message, and the second message may correspond to a deregistration request (AAI_DREG-REQ) message having is deregistration request code assigned with a value of 0x04.

Additionally, the first message may correspond to a deregistration response (AAI_DREG-RSP) message including an action code field assigned with a first value, wherein the first value indicates a shift to the DCR mode in the mobile station in an unsolicited manner, and the second message may correspond to a deregistration request (AAI_DREG-REQ) message including a deregistration request code being assigned with a second value, wherein the second value requests for an entry to the DCR mode as a response to the first value.

Furthermore, it is preferable that the start time information corresponds to an unavailability start time (UTI) field, that the interval information corresponds to an unavailable time interval (UTI) field, that the identifier corresponds to a content retention identifier (CRID), and that the third message corresponds to a deregistration response (AAI_DREG-RSP) message or a message acknowledgement (AAI_MSG-ACK) message.

In order to achieve the above-described general technical objects of the present invention, according to another embodiment of the present invention, a mobile station device performing a Deregistration with Content Retention (DCR mode) in a broadcast wireless access system, the mobile station device may include a processor; and a radio frequency (RF) (or wireless communication) module configured to transmit and receive radio signals to and from an external source based upon a control of the processor. Herein, the processor may perform control operations so that the mobile station can receive a first message in an unsolicited manner indicating an entry to the DCR mode from the base station and including start time information of a first time and interval information of the first time, transmit a second message requesting the DCR mode entry to the base station before a start time indicated by the start time information; and enter the DCR mode, when a third message is received from the base station as a response to the second message.

At this point, the processor may perform control operations so that the mobile station can transmit a ranging request (AAI_RNG-REQ) message including an identifier configured to identify a mobile station in the DCR mode and a ranging purpose indication field being assigned with a value indicating network re-entry from the DCR mode, when the first time is exhausted (or expired), and receive a ranging response (AAI_RNG-RSP) message from the base station, the ranging response (AAI_RNG-RSP) message including optimization information indicating a procedure that can be omitted during the network re-entry.

Additionally, the first message may correspond to a self organization and optimization network advertisement (AAI_SON-ADV) message, and the second message may correspond to a deregistration request (AAI_DREG-REQ) message having is deregistration request code assigned with a value of 0x04.

Additionally, the first message may correspond to a deregistration response (AAI_DREG-RSP) message including an action code field assigned with a first value, wherein the first value indicates a shift to the DCR mode in the mobile station in an unsolicited manner, and the second message may correspond to a deregistration request (AAI_DREG-REQ) message including a deregistration request code being assigned with a second value, wherein the second value requests for an entry to the DCR mode as a response to the first value.

Furthermore, it is preferable that the start time information corresponds to an unavailability start time (UTI) field, that the interval information corresponds to an unavailable time interval (UTI) field, that the identifier corresponds to a content retention identifier (CRID), and that the third message corresponds to a deregistration response (AAI_DREG-RSP) message or a message acknowledgement (AAI_MSG-ACK) message.

Effects of the Invention

According to the exemplary embodiments of the present invention, the present invention has the following effects.

Firstly, by using the exemplary embodiments of the present invention, the mobile station may efficiently enter the DCR mode respective to an initiation of the base station.

Secondly, since information enabling the mobile station to perform quick network re-entry is retained by a network entity, the mobile station may efficiently perform network re-entry.

Thirdly, by using the exemplary embodiments of the present invention, the mobile station may efficiently enter the DCR mode respective to an AAI_SON-ADV (Self Organizing and Optimizing Network) message of the base station.

Finally, since information enabling the mobile station to perform quick network re-entry is retained by a network entity, the mobile station may efficiently perform network re-entry.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
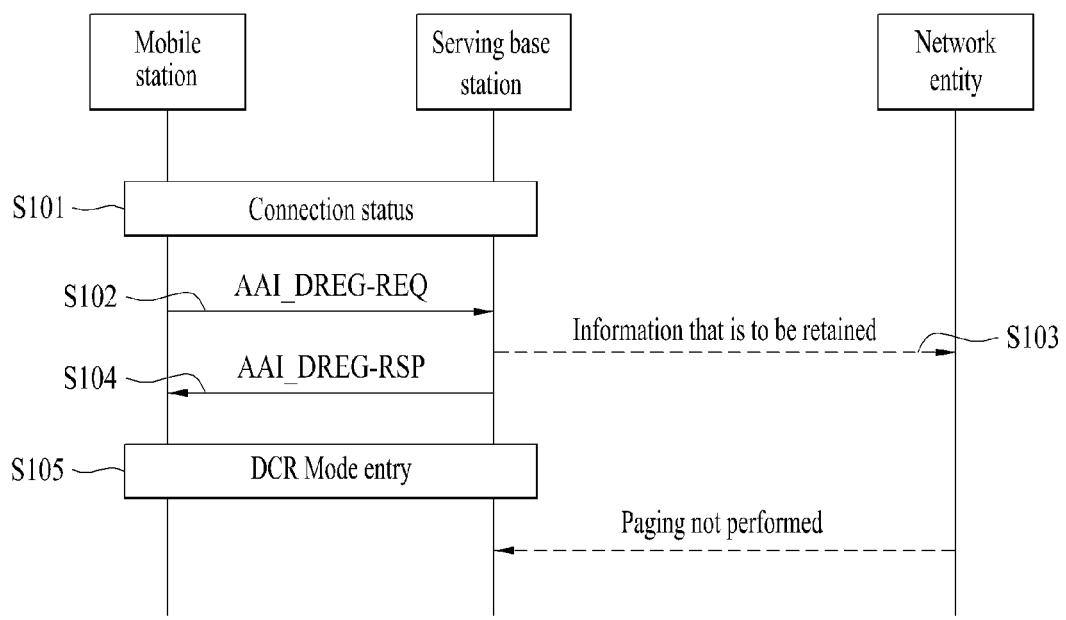
FIG. 1 illustrates an exemplary DCR mode entry procedure of a mobile station according to the present invention.

The present invention relates to a wireless access system. Hereinafter, the exemplary embodiments of the present invention will disclose diverse methods for enabling the base station efficiently initiate the DCR mode (ABS initiated DCR mode) and diverse methods for enabling the mobile station to efficiently enter the DCR mode in accordance with a broadcast message of the base station.

The embodiments of the present invention described below correspond to a predetermined form of assembly of the elements and characteristics of the present invention. If not mentioned otherwise, each element or characteristic of the present invention may be selectively considered. Also, each element or characteristic of the present invention may also be embodied without being assembled or combined with other elements or characteristics of the present invention. Furthermore, the embodiments of the present invention may be configured by assembling or combining part of the elements and/or characteristics of the present invention. The order of the operations described in the embodiments of the present invention may be altered. And, some of the elements or characteristics of any one embodiment of the present invention may be included in any other embodiment, or may replace the respective element or characteristic of the other embodiment of the present invention.

In the brief description of the drawings, any process or step that may deviate from the spirit or scope of the present invention will not be described herein. Furthermore, any process or step that may be understood by those skilled in the art has been omitted from the description set forth herein.

The specification of the present invention mainly describes the data-transmission and data-reception relation between a base station and a terminal. Herein, the base station has its significance as a terminal node of a network directly performing communication with the terminal. In, the description of the present invention, specific operations described to be performed by the base station may also be, in some occasion, performed by an upper node of the base station.

More specifically, it will be apparent that, in a network configured of multiple network nodes, a variety of operations performed in the network in order to communicate with the terminal may be performed by the base station or by other network nodes that do not belong to the base station. At this point, the term 'Base Station' may also be replaced with other terms, such as a fixed station, Node B, eNode B (eNB), access point, ABS (Advanced Base Station), and so on. Furthermore, the term 'MS (Mobile Station)' may be replaced with other terms, such as UE (User Equipment), SS (Subscriber Station), MSS (Mobile Subscriber Station), AMS (Advanced Mobile Station), or Mobile Terminal.

Additionally, a transmitting end represents a node for transmitting data or voice (or audio) services, and a receiving end represents a node for receiving data or voice (or audio) services. Therefore, in an uplink, the terminal may become the transmitting end, and the base station may become the receiving end. Similarly, in a downlink, the terminal may become the receiving end, and the base station may become the transmitting end.

Meanwhile, a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, and so on, may be used as the mobile terminal of the present invention.

The embodiments of the present invention may be realized by a variety of means. For example, the embodiments of the present invention may be realized as hardware, firmware, or software, or in a combined form of two or more of hardware, firmware, and software.

When configuring the embodiment of the present invention in the form of hardware, a method according to the embodiments of the present invention may be realized by using one or more of ASICs (application specific integrated circuits), DSPs (digital signal processors), DSPDs (digital signal processing devices), PLDs (programmable logic devices), FPGAs (field programmable gate arrays), a processor, a controller, a micro-processor, a micro-controller, and so on.

When configuring the embodiment of the present invention in the form of firmware or software, a method according to the embodiments of the present invention may be realized in the form of a module, procedure, or mathematical function performing the functions or operations described in the specification of the present invention. A software code may be stored in a memory unit so as to be configured by a processor. The memory unit may be placed inside or outside of the processor, thereby being capable of sending and receiving data with the processor through a variety of previously disclosed means.

The embodiments of the present invention may be supported by standard documents disclosed in at least one of the wireless access systems, the 802 system, the 3GPP system, the 3GPP LTE system, and the 3GPP2 system. More specifically, among the embodiments of the present invention, steps or part of the present invention that have not been described in order to clearly disclose the technical scope and spirit of the present invention, may be supported by the above-mentioned documents. All terms disclosed in the description of the present invention may be described by the above-mentioned documents. Particularly, the embodiments of the present invention may be supported by at least one or more standard documents of the IEEE 802.16 system, such as document P802.16-2004, document P802.16e-2005, document P802.16Rev2, and document IEEE P802.16m.

The specific terms used in the description of the present invention are merely provided to help and facilitate the understanding of the present invention. The usage of such term may vary within the technical scope and spirit of the present invention.

The description of the present invention will be given based upon the assumption that an IEEE 802.16 system is applied in the present invention. Most particularly, it will be assumed that the mobile station mentioned in the description of the present invention corresponds to an AMS (Advanced Mobile Station) satisfying the standard defined in the IEEE 802.16m standard.

Hereinafter, the DCR mode (Deregistration with Content Retention mode, hereinafter referred to as "DCR mode") proposed in the present invention will be described in detail.

The DCR mode refers to an operation mode during which, although the mobile station is deregistered from the network, the context of the corresponding mobile station is retained by a network entity until a Context Retention Timer is expired. Thereafter, when the mobile station attempts to perform network re-entry before the expiration of the Context Retention Timer, the base station requests for the context of the corresponding mobile station from the network entity and then receives the requested context, thereby enabling the network re-entry procedure of the mobile station to be performed efficiently.

In the DCR mode, a CRID (Context Retention Identifier) is used in order to uniquely identify the mobile station. When performing network entry, or when the mobile station (AMS) performs a zone change from a zone (LZone) supporting a legacy mobile station (YMS, mobile station of the IEEE802.16e standard) to a zone (MZone) supporting the AMS in the IEEE 802.16m system, such CRID may be included in a registration response (AAI_REG-RSP) message, which is received from the base station. When the mobile station performs network re-entry (when the mobile station performs handover and returns from the DCR mode or when the mobile station performs network re-entry in a coverage loss state), the CRID may be updated through a ranging response (AAI_RNG-RSP) message.

The above-mentioned DCR mode entry procedures will hereinafter be described with reference to FIG. 1.

FIG. 1 illustrates an exemplary DCR mode entry procedure of a mobile station according to the present invention.

Referring to FIG. 1, while a mobile station performs data exchange within a serving base station in a normal connection state with the serving base station, the mobile station may enter the DCR mode (S101).

In order to do so, the mobile station may initiate the DCR mode, by using a method of setting up a specific parameter value in a DCR mode deregistration request (AAI_DREG-REQ) message and transmitting the specific parameter value to the serving base station (S102).

At this point, it is preferable that the specific parameter corresponds to a Deregistration_Request_Code field, and the respective value may be set to 0x04, which corresponds to a value requesting the DCR mode entry. The configuration of the Deregistration_Request_Code field is as shown below in Table 2.

Table 2 indicates a partial format of the Deregistration Request message that may be applied to the exemplary embodiments of the present invention.

TABLE 2

| Field | Size (bits) | Value/Description | Condition |
|---|---|---|---|
| De-registration_Request_Code | 3 | Used to indicate the purpose of this message<br>0x00: AMS deregistration request from ABS and network<br>0x01: request for AMS deregistration from S-ABS and initiation of AMS idle mode<br>0x02: response for the unsolicited AAI-DREG-RSP message with action code 0x05 by the ABS.<br>0x03: reject for the unsolicited AAI-DREG-RSP message with action code 0x05 by the ABS. This code is applicable only when an AMS has a pending UL data to transmit.<br>0x04: request for AMS deregistration from S-ABS to enter DCR mode<br>0x05: response for the unsolicited AAI-DREG-RSP message with action code 0x00, 0x01, 0x02 or 0x03<br>0x06-0x07: reserved | |

At this point, the mobile station may request for a specific service and operation information to be retained for the purpose of DCR mode management. For such method, a method of including a specific service or operation information, and so on, which are requested for retention in the format of an Idle Mode Retain Information element.

In case the serving base station accepts the DCR mode entry request of the mobile station, the mobile station may deliver the information requested for retention to a Network entity (S103).

Additionally, in the deregistration response message (AAI_DREG-RSP), an action code is assigned with a value (e.g., 0x08) indicating the allowance of DCR mode entry of the mobile station, which may then be transmitted to the mobile station (S104).

After receiving the deregistration response message (AAI_DREG-RSP) from the serving base station, the mobile station may start the context retention timer and may be operated in the DCR mode (S105).

In the above-described procedure, the order of step S103 and step S104 may be changed. And, in case the base station rejects the DCR entry request of the mobile station, the action code of the deregistration response message (AAI_DREG-RSP) may be assigned with a value (e.g., 0x09) indicating DCR mode entry rejection of the mobile station, which may then be transmitted to the mobile station.

While the mobile station is operated in the DCR mode, basically, with the exception of a case when the mobile station requests for network re-entry in the DCR mode and a case when the mobile station requests for an extension of the resource retention time, the mobile station and the base station do not perform any type of data exchange including the paging procedure.

First Embodiment: Unsolicited Manner Based DCR Mode Initiation

In case the mobile station is required to be deregistered due to the circumstances of the base station (e.g., base station reconfiguration or restart, etc.), and in case the base station initiates the DCR mode in an unsolicited manner (or in case the base station performs an unsolicited manner based DCR mode initiation), a network re-entry procedure of the deregistered mobile station may be efficiently performed. Hereinafter, the unsolicited manner based DCR mode operation procedure of the base station will be described in detail.

First Aspect

An aspect of an exemplary embodiment of the present invention proposes a method of a base station for newly defining a Medium Access Control (MAC) management message, in order to direct (or indicate) a mobile station being registered to the base station of its DCR mode entry, and for using the newly defined MAC management message in order to perform the DCR mode in an unsolicited manner (or the unsolicited manner based DCR mode initiation).

The corresponding procedure will be described in detail with reference to FIG. 2.

Figure 2:
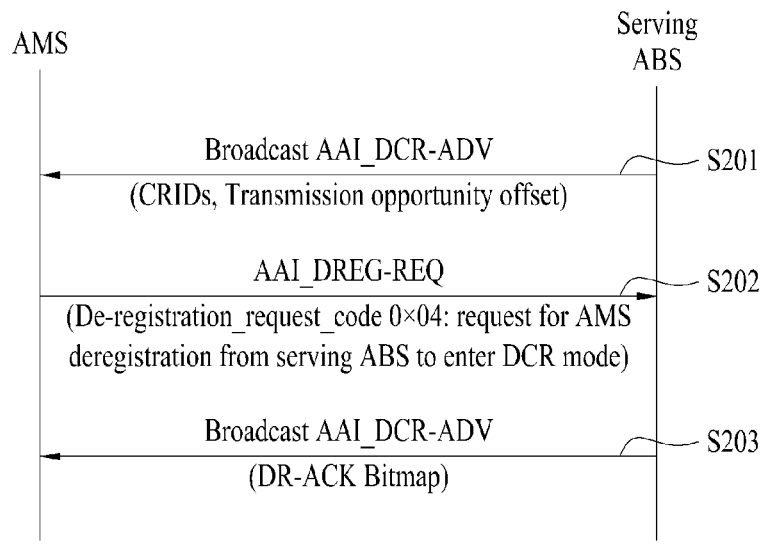
FIG. 2 illustrates an exemplary method for performing an unsolicited DCR mode of the base station according to an aspect of the exemplary embodiment of the present invention.

FIG. 2 illustrates an exemplary method for performing an unsolicited DCR mode of the base station according to an aspect of the exemplary embodiment of the present invention.

Referring to FIG. 2, the base station may request the mobile stations to shift to the DCR mode under specific circumstances, such as Reconfiguration, restart, backhaul link down, and so on.

First of all, a MAC message requesting for a DCR mode shift, which is proposed in the present invention, (hereinafter referred to as a deregistration with content retention advertisement (AAI_DCR-ADV) message) is transmitted from the base station to the mobile stations in an unsolicited manner (S201).

Table 3 shown below indicates an exemplary AAI_DCR-ADV message format according to the exemplary embodiment of the present invention.

In step S201, the base station may assign the action code with 0b00 (signaling the mobile station with a DCR mode entry in an unsolicited manner), and the action code may be transmitted to the mobile station along with the CRID and the Transmission opportunity offset. After receiving an AAI_DCR-ADV message from the base station, the mobile station verifies the Action code with its CRID, and, at the

TABLE 3

AAI_DCR-ADV format

| Name | Size (bit) | Usage |
|---|---|---|
| AAI_DCR-ADV format { | | |
| Management massage type | 8 | |
| Action_Code | 1 | 0b00: To signal AMS to begin DCR mode in unsolicited manner |
| | | 0b01: Response of AMS's DCR mode request |
| Num_AMSs | | |
| if (Action_Code == 0) { | | |
| for (i=0; i < Num_AMSs; i++) { | | — |
| CRID | 24 | The AMS identifier which the AMS has been assigned for coverage loss or DCR mode and currently maintains. |
| | | It shall be included when the AMS is attempting to perform network reentry from coverage loss or DCR mode |
| Transmission opportunity offset | 8 | A transmission opportunity assigned to the AMS, to be used for DCR mode request, in units of symbol duration. |
| }<br>}<br>if (Action_Code == 1) { | | |
| DR(DCR mode Request )-ACK bitmap | Num_AMS | Each bit indicates the decoding status of AMS's DCR request |
| | | 0b0: No DCR request is detected and AMS can retransmit the AAI_DREG-REQ with action code 0x04 until the retry_count is exhausted. |
| | | 0b1: DCR request is detected and AMS shall begin DCR mode. |
| for (i=0; i < Num_Positive_DR_ACK; i++) { | | Num_Postive_DR_ACK is the number of bits set to one in the DR-ACK bitmap |
| Idle Mode Retain Information<br>}<br>}<br>} | | |

As shown in Table 3, the AAI_DCR-ADV message proposed in the present invention may include an Action Code field, which may be configured of a value for indicating the mobile station of its unsolicited manner based DCR mode entry, a field indicating a number of target mobile stations, a CRID respective to each mobile station, a Transmission opportunity offset for notifying (or indicating) an uplink resource enabling the mobile station o perform the DCR mode request in symbol section (or symbol interval) units, and so on. In case the Action Code field is assigned with a value indicating a response to the DCR mode entry request of the mobile station, a DR-ACK bitmap field, which indicates whether or not the base station has detected a DCR mode request of the mobile station in bitmap units, and an Idle Mode Retaon (Retain) Information field, which indicate context information of the mobile station that is being retained. As described above, the CRID may be allocated in advance during a registration process or a network re-entry procedure of the mobile station. Herein, when the CRID has the same value as the pre-allocated CRID (i.e., in case the base station does not change the CRID respective to the corresponding mobile station), the CRID field may be omitted.

point indicated by the Transmission opportunity offset field, the mobile station may assign the deregistration request code of the deregistration request (AAI_DREG-REQ) message with a value (e.g., 0x04) requesting DCR mode entry and may transmit the corresponding value to the base station (S202).

After receiving the AAI_DREG-REQ (De-registration_request_code 0x04) from the mobile station, as a response to the received AAI_DREG-REQ, the base station transmits an AAI_DCR-ADV message to the mobile stations (S203).

At this point, in the AAI_DCR-ADV message, the Action Code field is assigned with 0b01, and a DR, (DCR mode Request)-ACK bitmap is included in the Action Code field, so as to be transmitted. The mobile station receives the corresponding message and verifies the DR-ACK bitmap. Then, in case the DR-ACK bitmap is assigned with 0b00, an AAI_REG-REQ (De-registration_request_code 0x04) message for requesting DCR mode entry, until a retry_count of the pre-determined value is exhausted, may be re-transmitted. Also, once the mobile station verifies the DR-ACK bitmap, and when the DR-ACK bitmap is assigned with 0b01, the mobile station shifts to the DCR mode.

Second Aspect

Another aspect of an exemplary embodiment of the present invention proposes a method of a base station for using a newly defined Medium Access Control (MAC) management message, in order to direct (or indicate) a mobile station being registered to the base station of its DCR mode entry, and for using a control extension header in order to perform the DCR mode in an unsolicited manner (or the unsolicited manner based DCR mode initiation). More specifically, the exemplary embodiment of the present invention proposes a method of a mobile station transmitting a message acknowledgement response message instead of a de-registration request message to the base station, in order to request the base station for DCR mode entry. The corresponding procedure will be described in detail with reference to FIG. 3.

Figure 3:
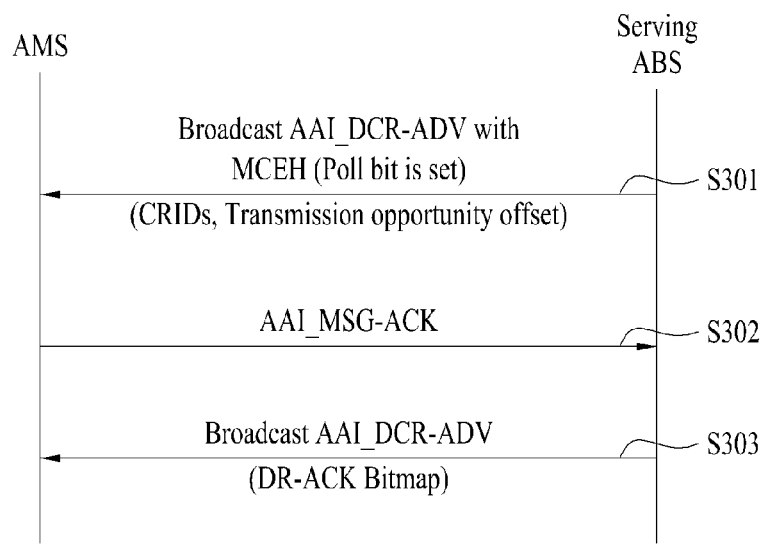
FIG. 3 illustrates an exemplary method for performing an unsolicited DCR mode of the base station according to another aspect of the exemplary embodiment of the present invention.

FIG. 3 illustrates an exemplary method for performing an unsolicited DCR mode of the base station according to another aspect of the exemplary embodiment of the present invention.

Referring to FIG. 3, the base station may request the mobile stations to shift to the DCR mode under specific circumstances, such as Reconfiguration, restart, backhaul link down, and so on.

First of all, the base station transmits an AAI_DCR-ADV message to the mobile stations in an unsolicited manner (S301).

At this point, the base station transmits, along with the AAI_DCR-ADV message, information, which is configured to direct (or indicate) information on whether or not the corresponding message has been received to be replied by using a message acknowledgement (AAI_MSG-ACK) message, e.g., a MAC control extension header (MCEH) assigned with a polling bit, to the mobile station.

Table 4 shown below indicates an exemplary AAI_DCR-ADV message format according to the exemplary embodiment of the present invention.

TABLE 4

| Name | Size (bit) | Usage |
|---|---|---|
| AAI_DCR-ADV format { | | |
| Management massage type | 8 | |
| Action_Code | 1 | 0b00: To signal AMS to begin DCR mode in unsolicited manner<br>0b01: Response of AMS's DCR mode request |
| Num_AMSs<br>if (Action_Code == 0) {<br>for (i-0; i < Num_AMSs; i++) { | | |
| CRID | 24 | The AMS identifier which the AMS has been assigned for coverage loss or DCR mode and currently maintains.<br>It shall be included when the AMS is attempting to perform network reentry from coverage loss or DCR mode |
| Transmission opportunity offset | 8 | A transmission opportunity assigned to the AMS, to be used for DCR mode request, in units of symbol duration. |
| }<br>}<br>if (Action_Code == 1) {<br>  DR(DCR mode Request )-ACK bitmap | Num_AMS | Each bit indicates the decoding status of AAI_MSG-ACK which is transmitted by AMSs.<br>0b0: No AAI_MSG-ACK is detected.<br>0b1: AAI_MSG-ACK is detected and AMS shall begin DCR mode. |
| for (i=0; i < Num_Positive_DR_ACK; i++)<br>{<br>Idle Mode Retain Information<br>}<br>}<br>} | — | Num_Postive_DR_ACK is the number of bits set to one in the DR-ACK bitmap |

AAI_DCR-ADV format

As shown in Table 4, the AAI_DCR-ADV message proposed in the exemplary embodiment of the present invention has a similar format as the AAI_DCR-ADV message shown in Table 1 above. However, in Table 4, the DR-ACK bitmap field has been changed to indicate the detection of an AAI_MSG-ACK message instead of the AAI_DREG-REQ message. Since the remaining fields are similar to those shown in Table 2, detailed description of the same will be omitted for simplicity.

In step S301, the base station may assign the action code of the AAI_DCR-ADV message with 0b00 (signaling the mobile station with a DCR mode entry in an unsolicited manner), and the action code may be transmitted to the mobile station along with the CRID and the Transmission opportunity offset. After receiving an AAI_DCR-ADV message from the base station, the mobile station verifies the Action code with its CRID and the MCEH, and, at the point indicated by the Transmission opportunity offset field, the mobile station may transmit the message acknowledgement response (AAI_MSG-ACK) message to the base station (S302).

After receiving the AAI_MSG-ACK message from the mobile station, as a response to the received AAI_MSG-ACK message, the base station transmits an AAI_DCR-ADV message, which is assigned with 0b01 in the Action Code field, to the mobile stations (S303).

At this point, in the AAI_DCR-ADV message, a DR (DCR mode Request)-ACK bitmap is included in the Action Code field, so as to be transmitted. The mobile station receives the corresponding message and verifies the DR-ACK bitmap. Then, in case the DR-ACK bitmap is assigned with 0b01, the mobile station shifts to the DCR mode. Additionally, after verifying that the DR-ACK bitmap is assigned with 0b00, the mobile station transmits an AAI_REG-REQ message having the De-registration_request_code set to 0x04), so as to request the base station to be newly shifted to the DCR mode.

Third Aspect

Yet another aspect of an exemplary embodiment of the present invention proposes a method of a base station for performing the DCR mode in an unsolicited manner (or the unsolicited manner based DCR mode initiation), in which a mobile station attempts to perform handover to another base station depending upon whether or not a message for the DCR mode entry request of the corresponding mobile station has been detected, after the base station has notified the mobile station registered to the base station of its entry to the DCR mode.

As compared to the first embodiment of the present invention and the second embodiment of the present invention, the method for performing DCR mode according to the exemplary embodiment of the present invention, the method is similar up to the process of transmitting a response to the DCR mode entry request of the mobile station through an AAI_DCR-ADV message. However, the operations of each mobile station vary from one another depending upon the DR-ACK bitmap value included in the AAI_DCR-ADC message. More specifically, in the DR-ACK bitmap, in case a bit of the corresponding mobile station indicates that a DCR mode entry request has been successfully detected, the mobile station enters the DCR mode. And, in case a bit of the corresponding mobile station indicates that a DCR mode entry request has not been detected, instead of re-attempting (or retrying the DCR mode entry request, the mobile station may perform handover to another base station. This will be described in detail with reference to FIG. 4.

Figure 4:
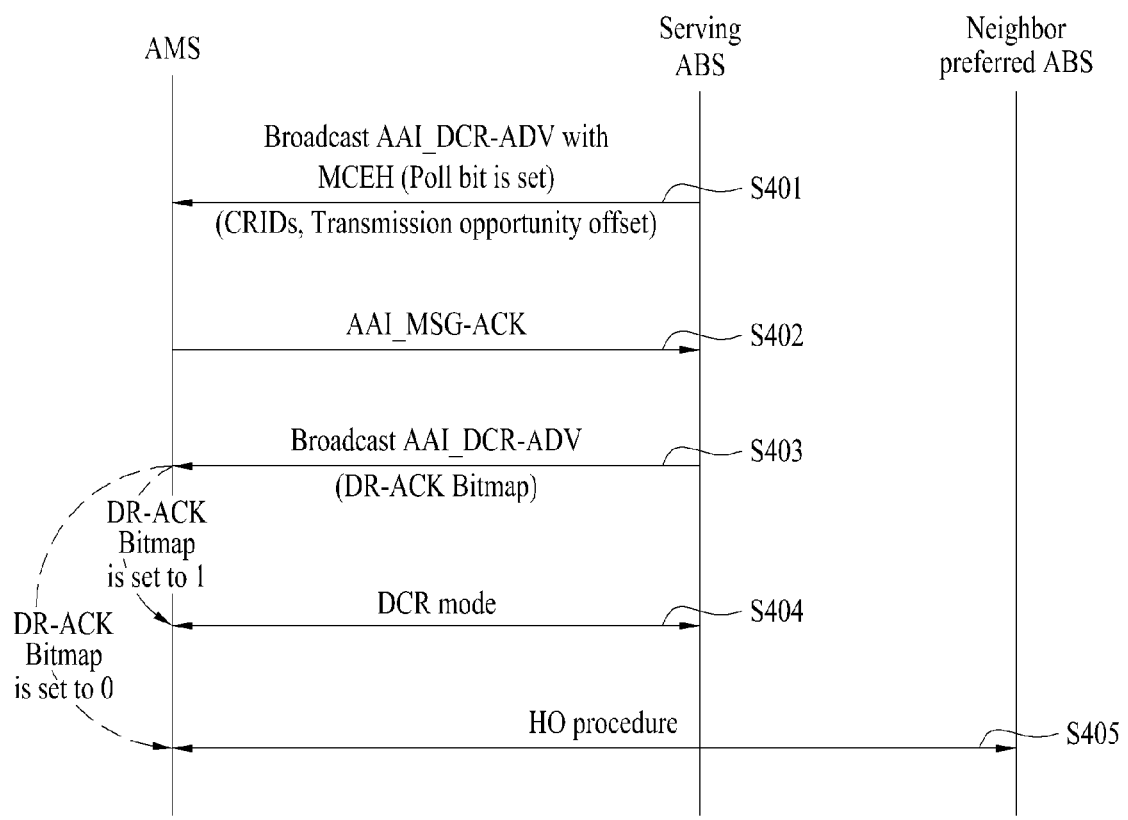
FIG. 4 illustrates an exemplary method for performing an unsolicited DCR mode of the base station according to yet another aspect of the exemplary embodiment of the present invention.

FIG. 4 illustrates an exemplary method for performing an unsolicited DCR mode of the base station according to yet another aspect of the exemplary embodiment of the present invention.

Herein, since step S401 to step S403 of FIG. 4 are respectively similar to step S301 to step S303 of FIG. 3, detailed description of the similar parts will be omitted for simplicity.

The mobile station receives the AAI-DCR-ADV message and verifies the DR-ACK bitmap, and, then, when the DR-ACK bitmap is assigned with 0b01, the mobile station shifts to the DCR mode (S404).

Conversely, in case the DR (DCR mode Request)-ACK bitmap value is assigned with a value of 0b00, the mobile station may perform handover to a preferred neighboring base station (S405).

In the above-described DCR mode operation procedure, step S401 to step S403 may be replaced with step S201 to step S203 of FIG. 2. In this case, in step S403, the DR-ACK bitmap becomes the response to an AAI_DREG-ACK message instead of the response to an AAI_MSG-ACK message.

Fourth Aspect

Yet another aspect of an exemplary embodiment of the present invention proposes a method of a base station for using a newly defined Medium Access Control (MAC) management message, in order to direct (or indicate) a mobile station of its DCR mode entry and to allow the mobile station to respond to the notification (or indication) of the base station as part of the band request (BR) process. More specifically, the exemplary embodiment of the present invention proposes a method of a mobile station transmitting a BR preamble sequence and a quick access message instead of a de-registration request message to the base station, in order to request the base station for DCR mode entry. The corresponding procedure will be described in detail with reference to FIG. 5.

Figure 5:
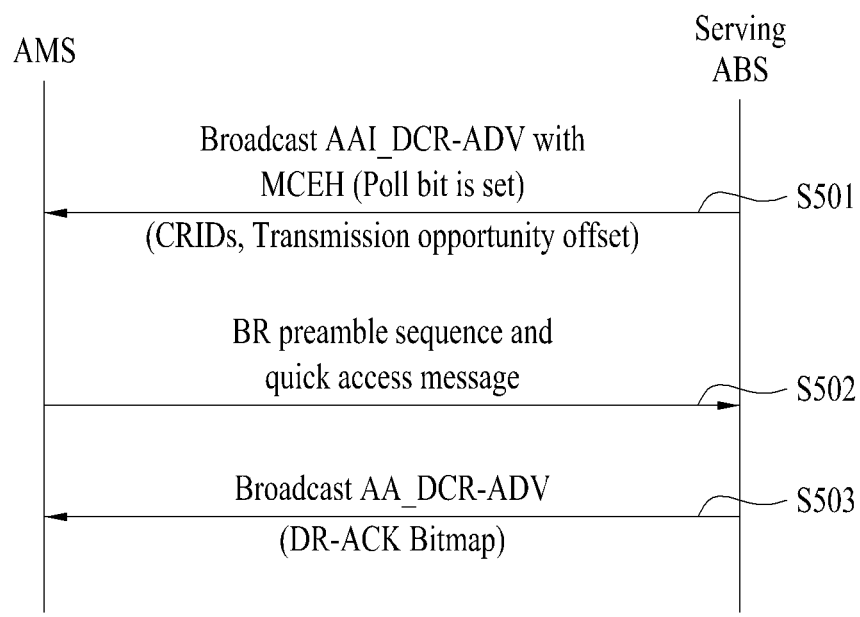
FIG. 5 illustrates an exemplary method for performing an unsolicited DCR mode of the base station according to yet another aspect of the exemplary embodiment of the present invention.

FIG. 5 illustrates an exemplary method for performing an unsolicited DCR mode of the base station according to yet another aspect of the exemplary embodiment of the present invention.

Referring to FIG. 5, the base station may request the mobile stations to shift to the DCR mode under specific circumstances, such as Reconfiguration, restart, backhaul link down, and so on.

First of all, the base station transmits an AAI_DCR-ADV message to the mobile stations in an unsolicited manner (S501).

At this point, the base station transmits, along with the AAI_DCR-ADV message, information, which is configured to direct (or indicate) a response to be transmitted, e.g., a MAC control extension header (MCEH) assigned with a polling bit, to the mobile station.

In step S501, the base station may assign the action code of the AAI_DCR-ADV message with 0b00 (signaling the mobile station with a DCR mode entry in an unsolicited manner), and the action code may be transmitted to the mobile station along with the CRID and the Transmission opportunity offset. After receiving an AAI_DCR-ADV message from the base station, the mobile station verifies the Action code with its CRID and the MCEH, and, at the point indicated by the Transmission opportunity offset field, the mobile station may transmit the BR preamble sequence and the quick access message to the base station (S502).

After receiving the BR preamble sequence and the quick access message from the mobile station, as a response to the received AAI_MSG-ACK message, the base station transmits an AAI_DCR-ADV message, which is assigned with 0b01 in the Action Code field, to the mobile stations (S503).

At this point, in the AAI_DCR-ADV message, a DR (DCR mode Request)-ACK bitmap is included in the Action Code field, so as to be transmitted. The mobile station receives the corresponding message and verifies the DR-ACK bitmap. Then, in case the DR-ACK bitmap is assigned with 0b01, the mobile station shifts to the DCR mode. Additionally, after verifying that the DR-ACK bitmap is assigned with 0b00, the mobile station transmits an AAI_REG-REQ message having the De-registration_request_code set to 0x04), so as to request the base station to be newly shifted to the DCR mode, or to perform handover to another base station.

In the above-described embodiment of the present invention, when the mobile station seeks to extend the DCR mode, i.e., when the mobile station seeks to extend the context retention timer, the mobile station may assign a value of 0b0100 to a Ranging Purpose Indication field and include a CRID in a ranging request message (AAI_RNG-REQ) before the exhaustion (or expiration) of the timer. And, then, the ranging request message may be transmitted to the base station.

Additionally, in case the mobile station seeks to perform network re-entry in the DCR mode, the mobile station may assign a value of 0b1000 to a Ranging Purpose Indication field and include a CRID in a ranging request message (AAI_RNG-REQ) before the exhaustion (or expiration) of the timer. Since the subsequent network re-entry procedure is similar to the network re-entry procedure from an Idle Mode of a general IEEE 802.16m system, a detailed description of the same will be omitted for simplicity.

DCR Mode Operation Procedure Respective to a SON-Related Procedure of the Base Station In case the Self-Organizing and Optimizing Network (SON) operation of the base station is performed (e.g., base station reconfiguration or restart, etc.), the base station broadcasts the respective information through an AAI_SON-ADV message. In this case, when the mobile stations that receive services from the corresponding base station enter the DCR mode, after the SON-related procedure of the base station is completed, the network re-entry procedure of the de-registered mobile station may be efficiently performed.

Hereinafter, diverse methods for initiating a DCR mode operation procedure according to another embodiment of the present invention in accordance with the AAI_SON-ADV message respective to the SON-related procedure of the base station will be described in detail.

First Aspect

In aspect of the other exemplary embodiment of the present invention, when the base station indicates the performance of re-configuration (or re-organization) through an AAI_SON-ADV message, a method of the mobile station for entering the DCR mode is provided. This will be described in detail with reference to FIG. 6.

Figure 6:
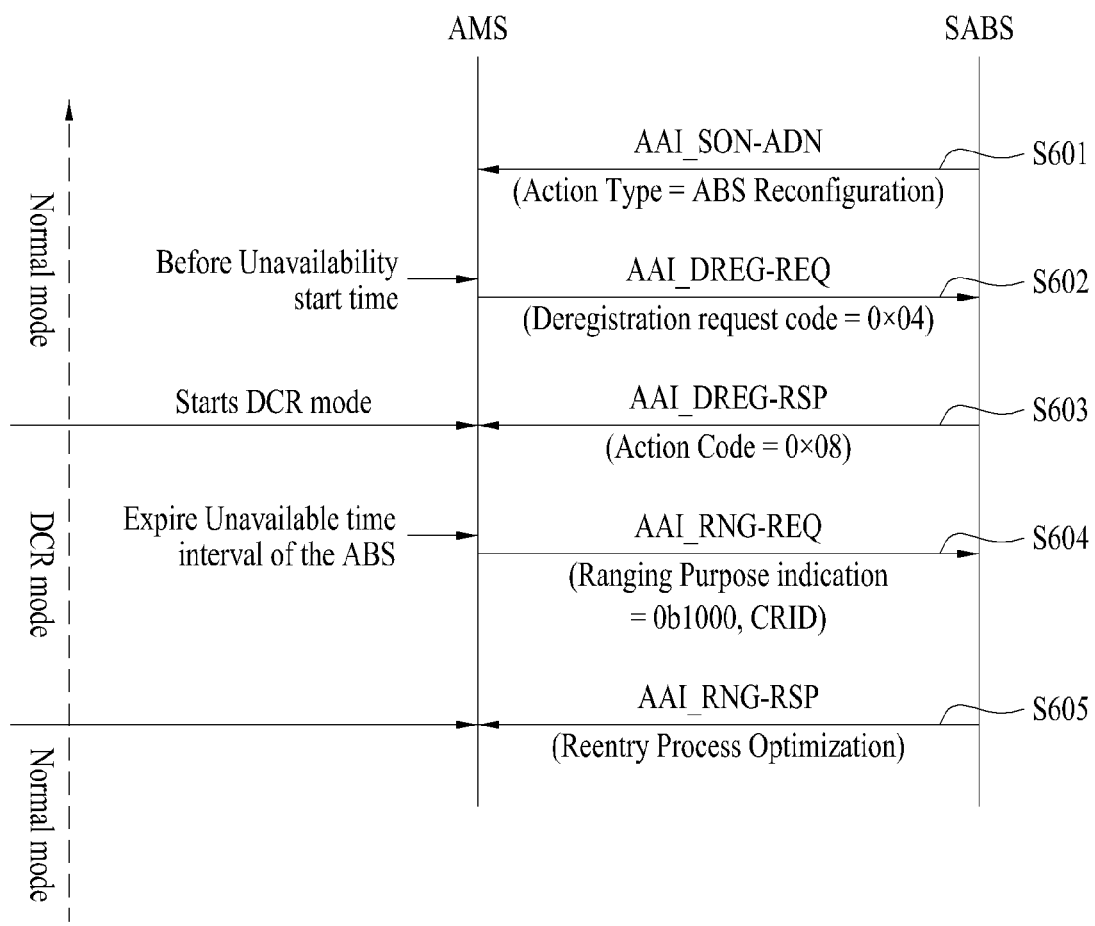
FIG. 6 illustrates exemplary DCR mode entry and network re-entry procedures of the mobile station according to an aspect of another exemplary embodiment of the present invention.

FIG. 6 illustrates exemplary DCR mode entry and network re-entry procedures of the mobile station according to an aspect of another exemplary embodiment of the present invention.

Referring to FIG. 6, when the SON-related operation of the base station corresponds to the base station (ABS) re-configuration (or re-organization), the base station may assign the Action type field of the AAI_SON-ADV message with a value indicating ABS Reconfiguration (e.g., 0b000) and may include a UST (Unavailability start time) value and a UTI (Unavailability time interval of the ABS) value in the action type field, which is then transmitted to the mobile station (S601).

Herein, the UTS may indicate a start time of an Unavailable time, which corresponds to a time during which the base station cannot provide the mobile station with normal services to the mobile stations in order to perform the corresponding SON operation, in frame units.

After receiving the AAI_SON-ADV message, the mobile station transmits a de-registration request (AAI_DREG-REQ) message, which with a Deregistration request code is assigned with a value requesting DCR mode entry (i.e., 0x04), to the base station before the start time indicated by the UST field (S602).

In case the base station accepts the DCR mode entry request of the mobile station, the base station transmits a Deregistration response (AAI_DREG-RSP) message, wherein the action code is assigned with a value of 0x08 (This option is valid only in response to an AAI_DREG-REQ message with De-Registration Request Code 0x04 to allow retention of the AMS's connection information) to the mobile station, and, after receiving the corresponding AAI_DREG-RSP message, the mobile station enters the DCR mode (S603).

Starting from the start time indicated by the UST field, when the time interval indicated by the UTI field is expired (expire Unavailable time interval of ABS), this indicates that the ABS Reconfiguration procedure is completed. Therefore, the mobile station may assign a ranging purpose indication field with a value (0b1000) indicating network re-entry from the DCR mode, and the mobile station may transmit a ranging request (AAI_RNG-REQ) message including the ranging purpose indication field and the CRID to the base station (S604).

Subsequently, after receiving the ranging response (AAI_RNG-RSP) message from the base station, the mobile station may operate in the normal mode (S605).

At this point, a Reentry Process Optimization parameter is included in the ranging response message, and, accordingly, a process (or procedure) that may be omitted in accordance with a retained context of the corresponding mobile station may be indicated to the mobile station. Therefore, the network reentry procedure of the mobile station may be performed more efficiently.

Second Aspect

Meanwhile, in another aspect of the exemplary embodiment of the present invention, when the mobile station has received the AAI_SON-ADV message in the Idle Mode, a method enabling the mobile station to enter the DCR mode is also provided.

The method for entering the DCR mode according to the second aspect of the present invention, a method of the mobile station for requesting a shift from the idle mode to the DCR mode is required to be defined. In order to do so, the exemplary embodiment of the present invention proposes a method for performing an operation mode shift from the idle mode to the DCR mode in the form of a location (or position) update through a ranging request message, wherein the rating purpose indication field is assigned with a specific value.

An example of the ranging purpose indication field according to the aspect of the present invention will hereinafter be described in detail with reference to Table 5 and Table 6 shown below.

TABLE 5

| Name | Value | Usage |
|---|---|---|
| Ranging Purpose Indication | If bit #N is set to 1, it indicates that the AMS is initiating location update for transition to idle mode from DCR mode. | It shall be included when the AMS is attempting to perform reentry, HO or, location update |

First of all, Table 5 shows a configuration of a case when the ranging purpose indication field is configured of a format wherein bits are allocated (r assigned) for each purpose. More specifically, when a specific bit of the ranging purpose indication field is set to 1, the ranging purpose indication field may indicate (or direct) the mobile station to perform a location update for the operation mode shift from the idle mode to the DCR mode.

TABLE 6

| Field | Size (bits) | Value/Description | Condition |
|---|---|---|---|
| Ranging Purpose Indication | 4 | 0b0000 = Initial network entry<br>0b0001—HO reentry<br>0b0010 = Network reentry from idle mode | |

TABLE 6-continued

| Field | Size (bits) | Value/Description | Condition |
|---|---|---|---|
| | | 0b0011 = Idle mode location update<br>0b0100—DCR mode extension<br>0b0101 = Emergency call setup (e.g., E911)<br>0b0110 = Location update for updating service flow management encodings of E-MBS flows<br>0b0111 = Location update for transition to DCR mode from idle mode<br>0b1000—Reentry from DCR mode, coverage loss or detection of different ABS restart count.<br>0b1001 = Network reentry from a Legacy BS<br>0b1010 = Zone switch to MZONE from LZONE<br>0b1011 = Location update due to power down.<br>0b1100 = Experiencing "femto interference"<br>0b1101 = NS/EP call setup<br>0b1110-0b1111 = reserved | |

Additionally, as shown in Table 6, when the ranging purpose indication field is configured of multiple bits (e.g., 4 bits), and when the ranging purpose indication field is assigned with a value of 0b0111, the ranging purpose indication field may indicate (or direct) the mobile station to perform a location update for the operation mode shift from the idle mode to the DCR mode.

Hereinafter, a procedure performed by the mobile station for shift the operation mode from the idle mode to the DCR mode by using the ranging request message including the above-described ranging purpose indication field with reference to Table 7 shown below.

Figure 7:
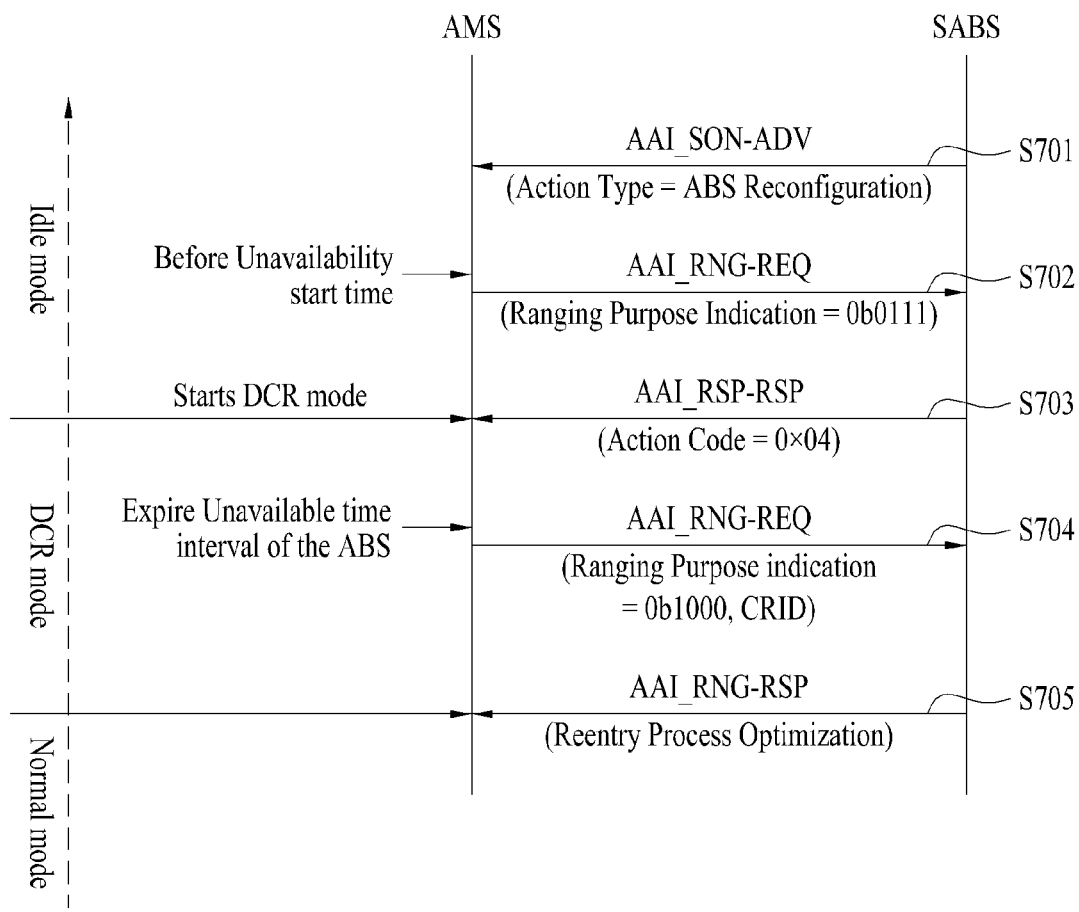
FIG. 7 illustrates exemplary DCR mode entry and network re-entry procedures of the mobile station according to another aspect of the other exemplary embodiment of the present invention.

FIG. 7 illustrates exemplary DCR mode entry and network re-entry procedures of the mobile station according to another aspect of the other exemplary embodiment of the present invention. In FIG. 7, it will be assumed that the ranging purpose indication field is configured of the format shown in Table 6.

Referring to FIG. 7, when the SON-related operation of the base station corresponds to the base station (ABS) re-configuration (or re-organization), the base station may assign the Action type field of the AAI_SON-ADV message with a value indicating ABS Reconfiguration (e.g., 0b000) and may include a UST value and a UTI value in the action type field, which is then broadcasted (S701).

While being operated in the idle mode, when the mobile station receives the AAI_SON-ADV message, which is transmitted from the base station, during a paging section (or paging interval) respective to a paging cycle, the mobile station transmits a ranging request message, wherein the ranging purpose indication field is assigned with a value of 0b0111, to the base station before the start point indicated by the UST field (S702).

In case the base station accepts the DCR mode entry request of the mobile station, the base station transmits a ranging response (AAI_RNG-RSP) message, wherein the action code is assigned with a value of 0x04 to the mobile station, and, after receiving the corresponding AAI_RNG-RSP message, the mobile station enters the DCR mode (S703).

Starting from the start time indicated by the UST field, when the time interval indicated by the UTI field is expired, this indicates that the ABS Reconfiguration procedure is completed. Therefore, the mobile station may assign a ranging purpose indication field with a value (0b1000) indicating network re-entry from the DCR mode, and the mobile station may transmit a ranging request (AAI_RNG-REQ) message including the ranging purpose indication field and the CRID to the base station (S704).

Subsequently, after receiving the ranging response (AAI_RNG-RSP) message from the base station, the mobile station may operate in the normal mode (S705).

At this point, a Reentry Process Optimization parameter is included in the ranging response message, and, accordingly, a process (or procedure) that may be omitted in accordance with a retained context of the corresponding mobile station may be indicated to the mobile station. Therefore, the network reentry procedure of the mobile station may be performed more efficiently.

Third Aspect

In yet another aspect of the other exemplary embodiment of the present invention, a method of a base station for indicating a mobile station, which is registered to the corresponding base station, to enter the DCR mode in an unsolicited manner, so that the corresponding mobile station can enter the DCR mode.

According to the third aspect of the present invention, as a method of the base station for requesting the mobile station to enter the DCR mode, an unsolicited deregistration response (unsolicited AAI_DREG-RSP) message, wherein the Action code is assigned with a specific value, may be used. At this point, it is preferable that the specific value of the Action code is newly defined, and the respective definition is as shown below.

Action code of AAI_DREG-RSP message=0x0N: AMS shall begin DCR mode initiation: to signal AMS to begin DCR in unsolicited manner. This option is valid when the ABS reconfigures or restart the system.

When the action code is 0x0N, it is preferable that the next parameter is also delivered through the unsolicited AAI_DREG-RSP message along with the Action code.

UST: Unavailability start time of ABS
UTI: Unavailable time interval of the ABS

Additionally, as a response to the unsolicited AAI_DREG-RSP (action code=0x0N), the mobile station may transmit an AAI_DREG-REQ in order to request the base station for a DCR mode entry. The embodiment of the present invention newly proposes a Deregistration request code for transmitting the AAI_DREG-REQ, as shown below.

Deregistration request code of AAI_DREG-REQ message=0x0M: response for the unsolicited AAI_D-REG-RSP message with action code 0x05 or 0x0N by the ABS. (Herein, it is preferable that the N value and the M value correspond to any one of the reserved bits.)

Alternatively, the conventional deregistration request code 0x02 may be corrected as shown below.

Deregistration request code of AAI_DREG-REQ message=0x02: response for the unsolicited AAI_D-REG-RSP message with action code 0x05 or 0x0N by the ABS.

Hereinafter, the method of the mobile station for entering the DCR mode according to the aspect of the present invention based upon field configuration of the above-described message will be described in detail with reference to FIG. 8.

Figure 8:
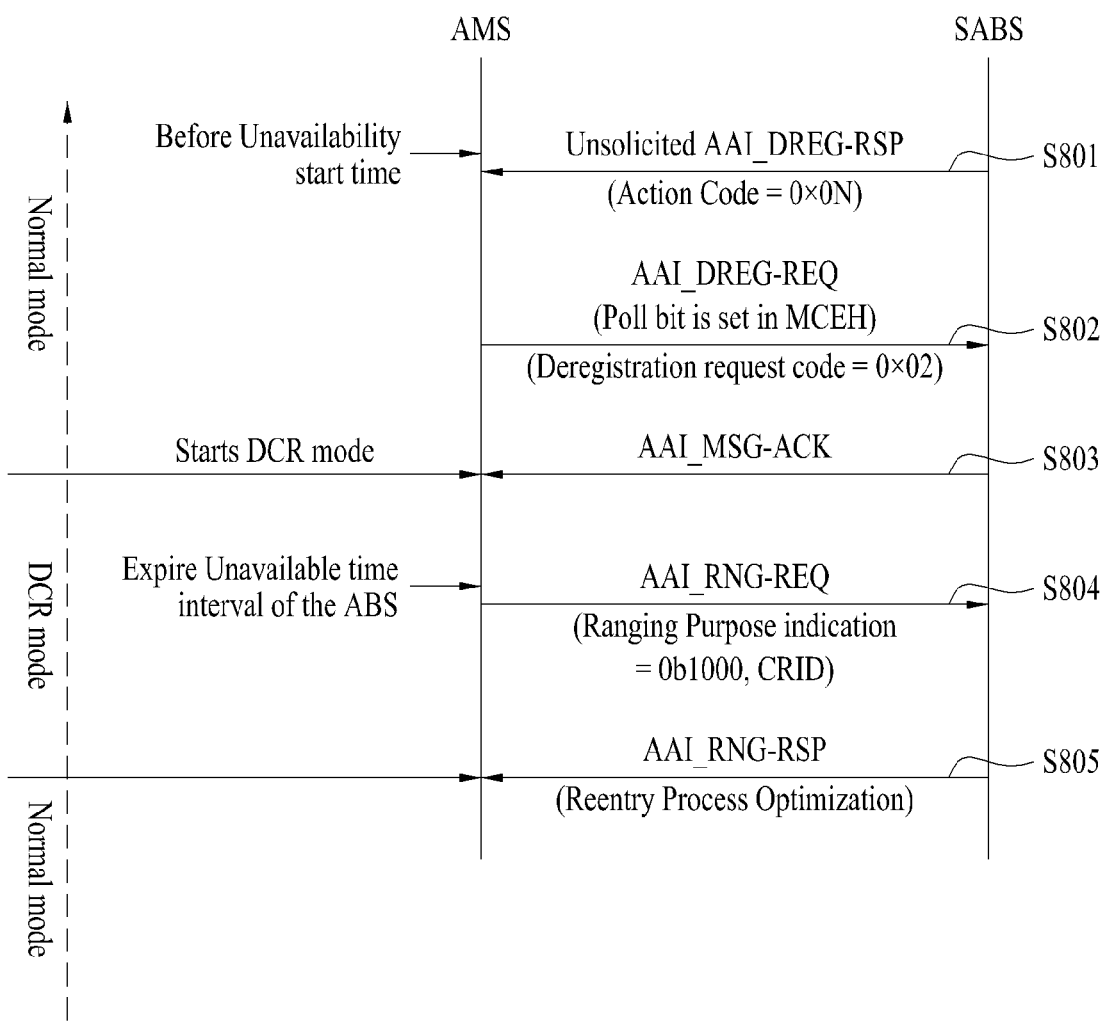
FIG. 8 illustrates exemplary DCR mode entry and network re-entry procedures of the mobile station according to yet another aspect of the other exemplary embodiment of the present invention.

FIG. 8 illustrates exemplary DCR mode entry and network re-entry procedures of the mobile station according to yet another aspect of the other exemplary embodiment of the present invention.

Referring to FIG. 8, when the base station reconfigures the configuration information (ABS reconfiguration) or restarts the system (ABS restart), the base station transmits an AAI_DREG-RSP (action code 0x0N) message in an unsolicited manner to the mobile station before UST (S801).

At this point, the UST field and the UTI field are included in the unsolicited AAI_DREG-RSP message.

When the mobile station receives the unsolicited AAI_D-REG-RSP message (action code=0x0N), the mobile station transmits the AAI_DREG-REQ message (Deregistration request code=0x02) in order to request DCR mode entry to the base station as a response to the received unsolicited AAI_DREG-RSP message. At this point, in order to receive an ACK (i.e., AAI_MSG-ACK message) respective to the AAI_DREG-REQ message from the base station, a poll bit may be set up in the MCEH (MAC Control Extended Header) (S802).

The base station receives the AAI_DREG-REQ (action code=0x02) from the mobile station and verifies that the polling bit is set up in the MCEH and, then, transmits AAI_MSG-ACK message. When the mobile station receives an AAI_MSG-ACK message from the base station, the mobile station shifts its operation mode to the DCR mode (S803).

Starting from the start time indicated by the UST field, when the time interval indicated by the UTI field is expired, this indicates that the ABS Reconfiguration procedure is completed. Therefore, the mobile station may assign a ranging purpose indication field with a value (0b1000) indicating network re-entry from the DCR mode, and the mobile station may transmit a ranging request (AAI_RNG-REQ) message including the ranging purpose indication field and the CRID to the base station (S804).

Subsequently, after receiving the ranging response (AAI_RNG-RSP) message from the base station, the mobile station may operate in the normal mode (S805).

At this point, a Reentry Process Optimization parameter is included in the ranging response message, and, accordingly, a process (or procedure) that may be omitted in accordance with a retained context of the corresponding mobile station may be indicated to the mobile station. Therefore, the network reentry procedure of the mobile station may be performed more efficiently.

Meanwhile, according to the aspect of the present invention, the base station may efficiently indicate (or direct) the mobile station of the DCR mode entry through an unsolicited AAI_SON-ADV message, instead of the unsolicited AAI_D-REG-RSP message. As opposed to the AAI_DREG-RSP message being a unicast message, since the AAI_SON-ADV message is a broadcast message, the base station may direct DCR mode entry to multiple mobile stations by performing a single transmission. Thus, a decrease in the signaling overhead may be expected.

In order to perform the above-described DCR mode performance procedure, the present invention proposes an Action Code field, which can request for a shift in the operation mode of the mobile station to the DCR mode, to be defined an Action type field of a general AAI_SON-ADV message. The field configuration of the AAI_SON-ADV message according to the other aspect of the exemplary embodiment of the present invention is as shown below.

First of all, the Action Type field may be configured as shown below in Table 7.

TABLE 7

| Field | Size (bits) | Value/Description | Condition |
|---|---|---|---|
| Action Type | 3 | Used to indicate the purpose of this message<br>0b000: ABS Reconfiguration<br>0b001: ABS Restart<br>0b010: ABS Scanning<br>0b011: ABS Reliability<br>0b100: LDM parameter change | mandatory |

Referring to Table 7, when the action type is set to 0b000, 0b001, or 0b01, a UST field and a UTI field may be included. Additionally, when the action type is set to 0b000, 0b001, 0b010, or 0b011, an Action code field may be included as shown below in Table 6.

TABLE 8

| Field | Size (bits) | Value/Description |
|---|---|---|
| Action code | 2 | 0b00: AMS shall begin initial network entry to neighbor preferred ABS. -If (Action code—0b00) {target preferred BS list(s)}<br>0b01: AMS shall begin DCR mode initiation: to signal AMS to begin DCR mode in unsolicited manner |

Referring to Table 8, when the action code field is assigned with 0b00, the base station may direct the mobile station to attempt network initial entry to another base station, and a target preferred BS list may be included in the AAI_SON-ADV message.

Additionally, when the action code field is assigned with 0b01, the base station may direct the mobile station to enter the DCR mode. In this case, the mobile station may send a request to the base station for a DCR mode entry through an AAI_DREG-REQ message. A deregistration request code 0x02 of the AAI_DREG-REG message for such request may be corrected as shown below.

Deregistration request code of AAI_DREG-REG message=0x02: a) response for the unsolicited AAI_D-REG-RSP message with action code 0x05 by the ABS b)

response for the AAI_SON-ADV message with action type (1st, 2nd, 3rd, or 4th value) and action code (0b01)

Hereinafter, the method of the mobile station for entering the DCR mode according to the other aspect of the exemplary embodiment of the present invention based upon field configuration of the above-described message will be described in detail with reference to FIG. 9.

Figure 9:
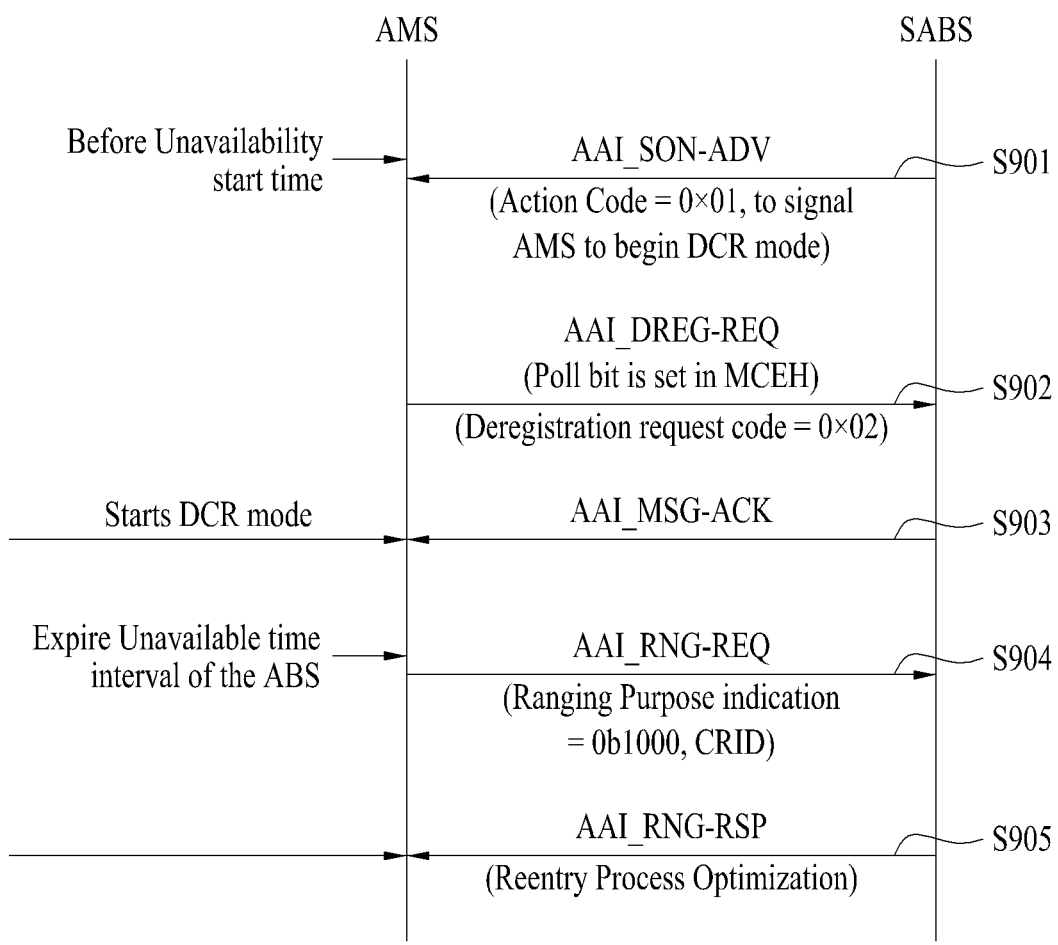
FIG. 9 illustrates exemplary DCR mode entry and network re-entry procedures of the mobile station according to yet another aspect of the other exemplary embodiment of the present invention.

FIG. 9 illustrates exemplary DCR mode entry and network re-entry procedures of the mobile station according to yet another aspect of the other exemplary embodiment of the present invention.

Referring to FIG. 9, when the base station reconfigures the configuration information (ABS reconfiguration) or restarts the system (ABS restart), the base station transmits an AAI_SON-ADV (action code 0x01) message in an unsolicited manner to the mobile station before UST (S901).

At this point, the UST field and the UTI field are included in the unsolicited AAI_SON-ADV message.

When the mobile station receives the unsolicited AAI_SON-ADV message (action code=0x01), the mobile station transmits the AAI_DREG-REQ message (Deregistration request code=0x02) in order to request DCR mode entry to the base station as a response to the received unsolicited AAI_DREG-RSP message. At this point, in order to receive an ACK (i.e., AAI_MSG-ACK message) respective to the AAI_DREG-REQ message from the base station, a poll bit may be set up in the MCEH (MAC Control Extended Header) (S902).

The base station receives the AAI_DREG-REQ (action code=0x02) from the mobile station and verifies that the polling bit is set up in the MCEH and, then, transmits AAI_MSG-ACK message. When the mobile station receives an AAI_MSG-ACK message from the base station, the mobile station shifts its operation mode to the DCR mode (S903).

Starting from the start time indicated by the UST field, when the time interval indicated by the UTI field is expired, this indicates that the ABS Reconfiguration procedure is completed. Therefore, the mobile station may assign a ranging purpose indication field with a value (0b1000) indicating network re-entry from the DCR mode, and the mobile station may transmit a ranging request (AAI_RNG-REQ) message including the ranging purpose indication field and the CRID to the base station (S904).

Subsequently, after receiving the ranging response (AAI_RNG-RSP) message from the base station, the mobile station may operate in the normal mode (S905).

At this point, a Reentry Process Optimization parameter is included in the ranging response message, and, accordingly, a process (or procedure) that may be omitted in accordance with a retained context of the corresponding mobile station may be indicated to the mobile station. Therefore, the network reentry procedure of the mobile station may be performed more efficiently.

Fourth Aspect

Yet another aspect of the exemplary embodiment of the present invention defines an operation (or action) procedure corresponding to a case when a mobile station receives a AAI_SON-ADV having an Action type field being assigned with an ABS Reliability.

When the Action type of the AAI_SON-ADV message is assigned with ABS Reliability, a Reason field may be configured as shown below in Table 9.

TABLE 9

| Reason | 3 | 0b000: Power down<br>0b001: Power reduction<br>0b010: FA change<br>0b011: Backhaul link down<br>0b100: Disable subframes | mandatory |
|---|---|---|---|

At this point, in the fourth aspect of the present invention, when the Reason field is assigned with the values of 0b000 (Power Down), 0b001 (Power reduction), 0b011 (Backhaul link down), it is proposed that the mobile station locates (or finds) another preferred ABS (base station), so as to perform initial network entry. This will be described in detail with reference to FIG. 10.

Figure 10:
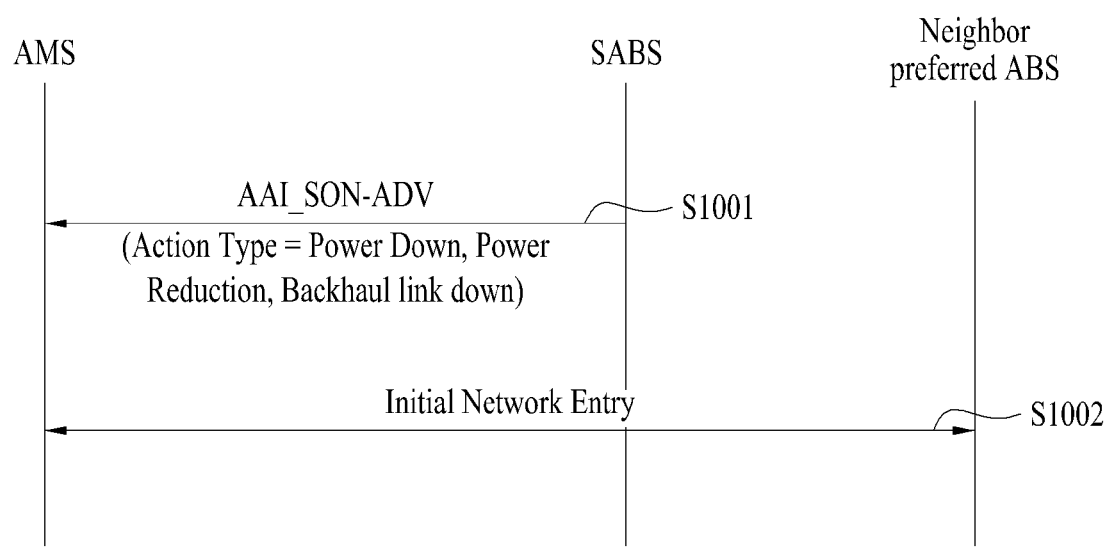
FIG. 10 illustrates an exemplary network re-entry procedure of the mobile station according to yet another aspect of the other exemplary embodiment of the present invention.

FIG. 10 illustrates an exemplary network re-entry procedure of the mobile station according to yet another aspect of the other exemplary embodiment of the present invention.

Referring to FIG. 10, when the base station performs ABS Reliability action (or operation) for any one of the reasons, such as Power Down, Power reduction, or Backhaul link down in association with the SON, the base station may assign the Action type field with a value (0b011) indicating ABS Reliability, and the base station may assign the Reason field with a value respective to the corresponding reason, thereby broadcasting the AAI_SON-ADV message (S1001).

At this point, a Recommended BSID list may be included in the AAI_SON-ADV message.

After receiving the above-described AAI_SON-ADV message from the base station, the mobile station may attempt (or try) to perform Initial Network Entry to a neighboring preferred base station (or ABS) (S1002).

At this point, the mobile station may refer to preferred ABS information included in the AAI_SON-ADV message. Additionally, when there is enough time remaining until the UST, the mobile station may perform handover to the neighboring preferred base station (or ABS).

Mobile Station and Base Station Structures

Hereinafter, according to another exemplary embodiment of the present invention a mobile station and a base station (FBS, MBS), in which the above-described exemplary embodiments of the present invention can be performed, will be described in detail.

The mobile station may operate as a transmitter in the uplink and may operate as a receiver in the downlink. Also, the base station may operate as a receiver in the uplink and may operate as a transmitter in the downlink. More specifically, the mobile station and the base station may include a transmitter and a receiver so as to transmit information or data.

The transmitter and the receiver may include a processor, a module, a part and/or means for performing the embodiments of the present invention. Particularly, the transmitter and the receiver may include a module (or means) for encoding (or encrypting) a message, a module for interpreting an encoded (or encrypted) message, an antenna for transmitting and receiving messages, and so on. An example of such transmitting end and receiving end will be described in detail with reference to FIG. 11.

Figure 11:
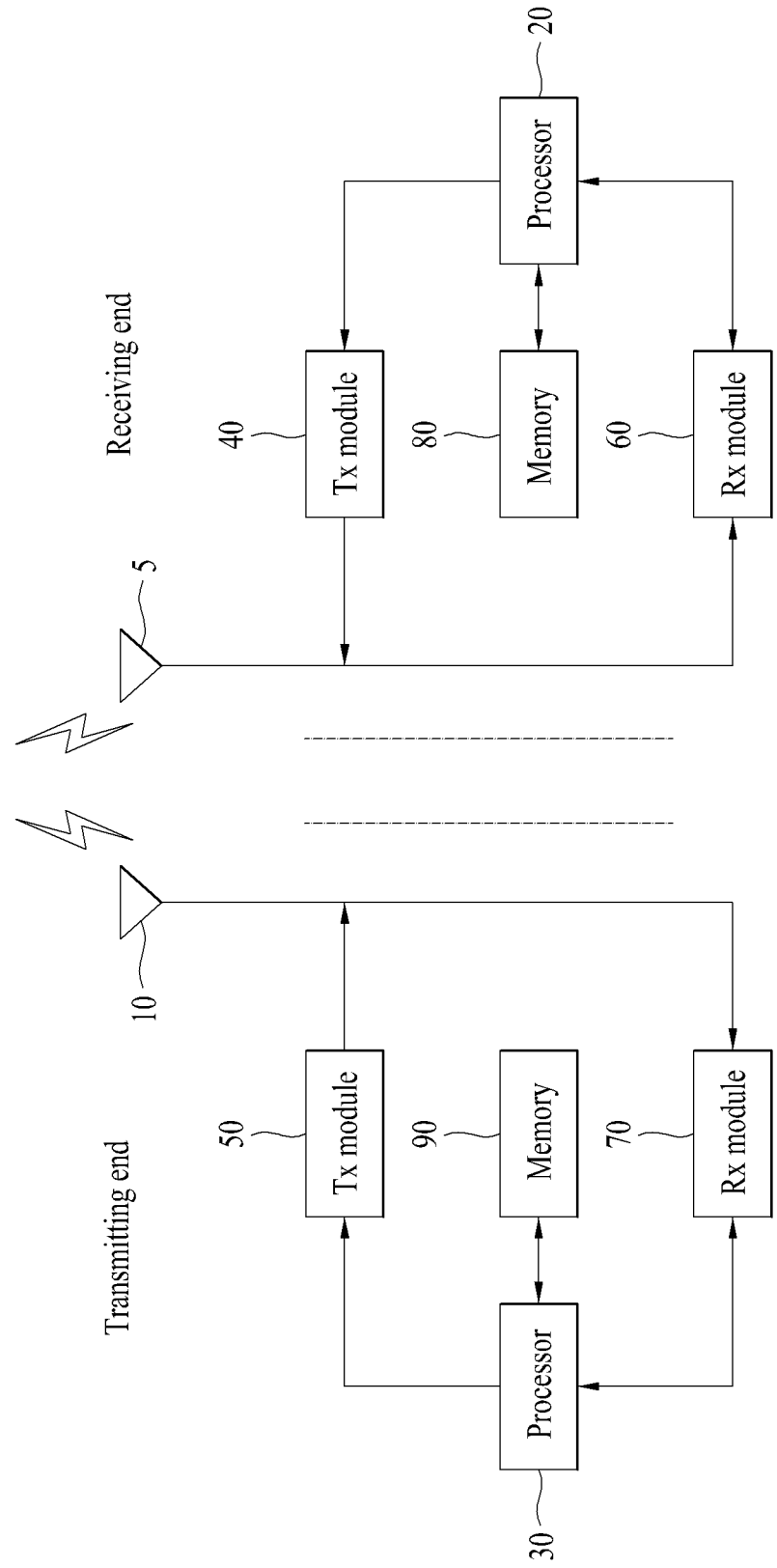
FIG. 11 illustrates a block view showing exemplary structures of a transmitting end and a receiving end according to yet another embodiment of the present invention.

FIG. 11 illustrates a block view showing exemplary structures of a transmitting end and a receiving end according to yet another embodiment of the present invention.

Referring to FIG. 5, the left side represents the structure of the transmitting end, and the right side represents the structure of the receiving end. Each of the transmitting end and the receiving end may include an antenna (5, 10), a processor (20, 30), a transmission module (Tx module) (40, 50), a receiving module (Rx module) (60, 70), and a memory (80, 90). Each element may perform its corresponding function. Hereinafter, each element will now be described in detail.

The antenna (5, 10) either transmits a signal created from the Tx module (40, 50) to the outside, or receives a wireless signal from the outside, thereby delivering the received signal to the Rx module (60, 70). When a Multiple-Input Multiple-Output (MIMO) antenna function is supported, at least 2 or more antennae may be provided herein.

The antenna, the transmission module, and the reception module may collectively configure a radio frequency (RF) module.

The processor (20, 30) generally controls the overall operations of the whole mobile terminal (or mobile station). For example, the processor may perform a controller function for performing the above-described embodiments of the present invention, a MAC (Medium Access Control) frame variable control function based upon service characteristics and frequency environment (or condition), a hand over function, and authentication and encoding (or encryption) functions.

More specifically, the processor (20, 30) may perform an overall control for performing the procedures related to the above-described random access.

hand over function, and authentication and encoding (or encryption) functions.

More specifically, the processor (20, 30) may perform an overall control for performing the procedures related to the above-described random access.

Most particularly, in order to perform the DCR mode operation according to the above-described exemplary embodiment of the present invention, the processor of the mobile station controls the wireless communication module so that a broadcast message (e.g., only the AAI_DCR-ADV message or the AAI_DCR-adv and an MCEH having a polling bit assigned thereto), which indicates (or directs) the DCR mode entry, can be received from the base station, and so that a respective message requesting the DCR mode entry (the AAI_DREG-REQ message or AAI_MSG-ACK message having a deregistration request code 0x04 assigned thereto or a BR preamble sequence and a quick access message) can be transmitted to the base station.

Thereafter, the processor of the mobile station verifies a detection result respective to its DCR mode entry request from a DR-ACK bitmap of the AAI_DCR-ADV message being broadcasted by the base station. Then, accordingly, the processor of the mobile station may perform control operations so that the base station can perform DCR mode entry, DCR mode entry re-request, or handover to another base station.

Additionally, in order to perform the DCR mode operations (or actions) according to the other exemplary embodiment of the present invention, the processor of the mobile station controls a wireless communication module, so that a broadcast message indicating the entry to the DCR mode (e.g., unsolicited AAI_SON-ADV message) or a unicast message (e.g., unsolicited AAI_DREG-RSP message) can be received from the base station. Then, accordingly, the processor of the mobile station may perform control operations enabling a message requesting an entry to the DCR mode (AAI_DREG-REQ message assigned with a Deregistration request code 0x04 or 0x02) to be transmitted to the base station.

Thereafter, when the response message (AAI_DREG-RSP or AAI_MSG-ACK) message is received, the processor of the mobile station may enter the DCR mode.

Moreover, the processor of the mobile mobile station may perform the overall control operations of the operation steps disclosed in the above-described exemplary embodiments of the present invention.

The Tx module (40, 50) may perform predetermined coding and modulation processes on the data scheduled by the processor (20, 30) and to be transmitted to the outside, thereby delivering the processed data to the antenna (10).

The Rx module (60, 70) may perform decoding and demodulation processes on a wireless signal received from the outside through the antenna (5, 10), so as to recover the processed data to the original (or initial) state, thereby delivering the recovered data to the processor (20, 30).

A program for processing and controlling the processor (20, 30) may be stored in the memory (80, 90). The memory (80, 90) may also perform functions for temporarily storing input/output data. Furthermore, the memory (80, 90) may include at least one type of storage means, such as a flash memory type, a hard disk type, a multimedia card micro type, a card-type memory (e.g., SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

Meanwhile, the base station may perform a controller function for performing the above-described embodiments of the present invention, an OFDMA (Orthogonal Frequency Division Multiple Access) packet scheduling, TDD (Time Division Duplex) packet scheduling, and channel multiplexing functions, MAC frame variable control function based upon service characteristics and frequency environment (or condition), a high-speed traffic real-time control function, a hand over function, authentication and encoding (or encryption) functions, packet modulation/demodulation functions for transmitting data, a high-speed channel coding function, and a real-time modem control function through at least one of the above-described modules, or the base station may further include a separate means, module, or part for performing such functions.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention.

Industrial Applicability

In the above-described broadband radio access system, a more efficient method for acquiring (or receiving) neighboring legacy base station information, a handover procedure using such method, and a device structure for the same have been described based upon an example being applied to an IEEE802.16m system. However, in addition to the IEEE802.xx systems, the present invention may also be applied to other various types of mobile communication systems, such as 3GPP/3GPP2.

What is claimed is:

1. A method for a mobile station to perform a Deregistration with Content Retention (DCR) mode respective to a request from a base station in a broadcast wireless access system, the method to perform the DCR mode comprises:

receiving a first broadcast message indicating an entry to the DCR mode from the base station;

transmitting a second message requesting the DCR mode entry to the base station;

receiving a third broadcast message including acknowledgement (ACK) information indicating whether or not the second message has been detected by the base station; and entering the DCR mode when the ACK information indicates a successful detection of the second message, wherein the second message corresponds to a message acknowledgement response (AAI MSG-ACK) message or a Quick Access Message being transmitted along with a bandwidth request (BR) preamble sequence, when the first broadcast message is transmitted along with a control extension header (MCEH) indicating a transmission of the second message, and wherein the second message corresponds to a deregistration request message having its deregistration request code assigned with a value of 0x04, when the first broadcast message is not accompanied with the control extension header.

2. The method of claim 1, wherein the first broadcast message comprises:

an identifier configured to identify the mobile station in the DCR mode and transmission opportunity offset information configured to indicate an uplink resource for transmitting the second message, and wherein the ACK information is configured in a bitmap format, and wherein the second message is transmitted through an uplink resource indicated by the transmission opportunity offset information.

3. The method of claim 2, further comprising:

retransmitting the second message to the base station; or performing handover to another base station, when the bit respective to the mobile station within the bitmap indicates that the detection of the second message has failed.

4. The method of claim 1, wherein the first broadcast message corresponds to a DCR advertisement (AAI_DCR-ADV) message having its Action code field assigned with a value indicating an entry to the DCR mode, and wherein the third broadcast message corresponds to the DCR advertisement message having the Action code field assigned with a value indicating a response to the second message.

5. A method for a mobile station to perform a Deregistration with Content Retention (DCR) mode respective to at least one mobile station by a base station in an unsolicited manner in a broadcast wireless access system, the method to perform the DCR mode comprises:

broadcasting a first broadcast message indicating an entry to the DCR mode;

receiving a second message requesting the DCR mode entry from the at least one mobile station; and broadcasting a third broadcast message including acknowledgement (ACK) information for each of the at least one mobile station, wherein the ACK information indicates whether or not the second message has been successfully received from each of the at least one mobile station, wherein the second message corresponds to a message acknowledgement response (AAI$_{13}$ MSG-ACK) message or a Quick Access Message being transmitted along with a bandwidth request (BR) preamble sequence, when the first broadcast message is broadcasted along with a control extension header (MCEH) indicating a transmission of the second message, and wherein the second message corresponds to a deregistration request message having its deregistration request code assigned with a value of 0x04, when the first broadcast message is not accompanied with the control extension header.

6. The method of claim 5, wherein the first broadcast message comprises:

an identifier configured to identify each of the at least one mobile station in the DCR mode and transmission opportunity offset information configured to indicate an uplink resource enabling each of the at least one mobile station to transmit the second message, and wherein the ACK information is configured in a bitmap format, and wherein the second message is received through an uplink resource indicated by the transmission opportunity offset information.

7. The method of claim 5, wherein the first broadcast message corresponds to a DCR advertisement (AAI_DCR-ADV) message having its Action code field assigned with a value indicating an entry to the DCR mode, and wherein the third broadcast message corresponds to the DCR advertisement message having the Action code field assigned with a value indicating a response to the second message.

8. A mobile station device performs a Deregistration with Content Retention (DCR) mode in a broadcast wireless access system, the mobile station device comprises:

a processor;

a transmission module configured to transmit radio signals to an external source based upon a control of the processor; and a receiving module configured to receive radio signals from the external source based upon a control of the processor, wherein the processor performs control operations:

so that the mobile station can first receive a first broadcast message indicating an entry to the DCR mode from the base station, transmit a second message requesting the DCR mode entry to the base station, receive a third broadcast message including acknowledgement (ACK) information indicating whether or not the second message has been detected by the base station, and enter the DCR mode when the ACK information indicates a successful detection of the second message, wherein the second message corresponds to a message acknowledgement response (AAI_MSG-ACK) message or a Quick Access Message being transmitted along with a bandwidth request (BR) preamble sequence, when the first broadcast message is transmitted along with a control extension header (MCEH) indicating a transmission of the second message, and wherein the second message corresponds to a deregistration request message having its deregistration request code assigned with a value of 0x04, when the first broadcast message is not accompanied with the control extension header.

9. The mobile station device of claim 8, wherein the first broadcast message comprises:

an identifier configured to identify the mobile station in the DCR mode and transmission opportunity offset information configured to indicate an uplink resource for transmitting the second message, and wherein the ACK information is configured in a bitmap format, and wherein the second message is transmitted through an uplink resource indicated by the transmission opportunity offset information.

10. The mobile station device of claim 9, wherein the controller retransmits the second message to the base station; or performs handover to another base station, when the bit respective to the mobile station within the bitmap indicates that the detection of the second message has failed.

11. The mobile station device of claim 8, wherein the first broadcast message corresponds to a DCR advertisement (AAI_DCR-ADV) message having its Action code field assigned with a value indicating an entry to the DCR mode, and wherein the third broadcast message corresponds to the DCR advertisement message having the Action code field assigned with a value indicating a response to the second message.

* * * * *